United States Patent Office 2,817,833
Patented Dec. 24, 1957

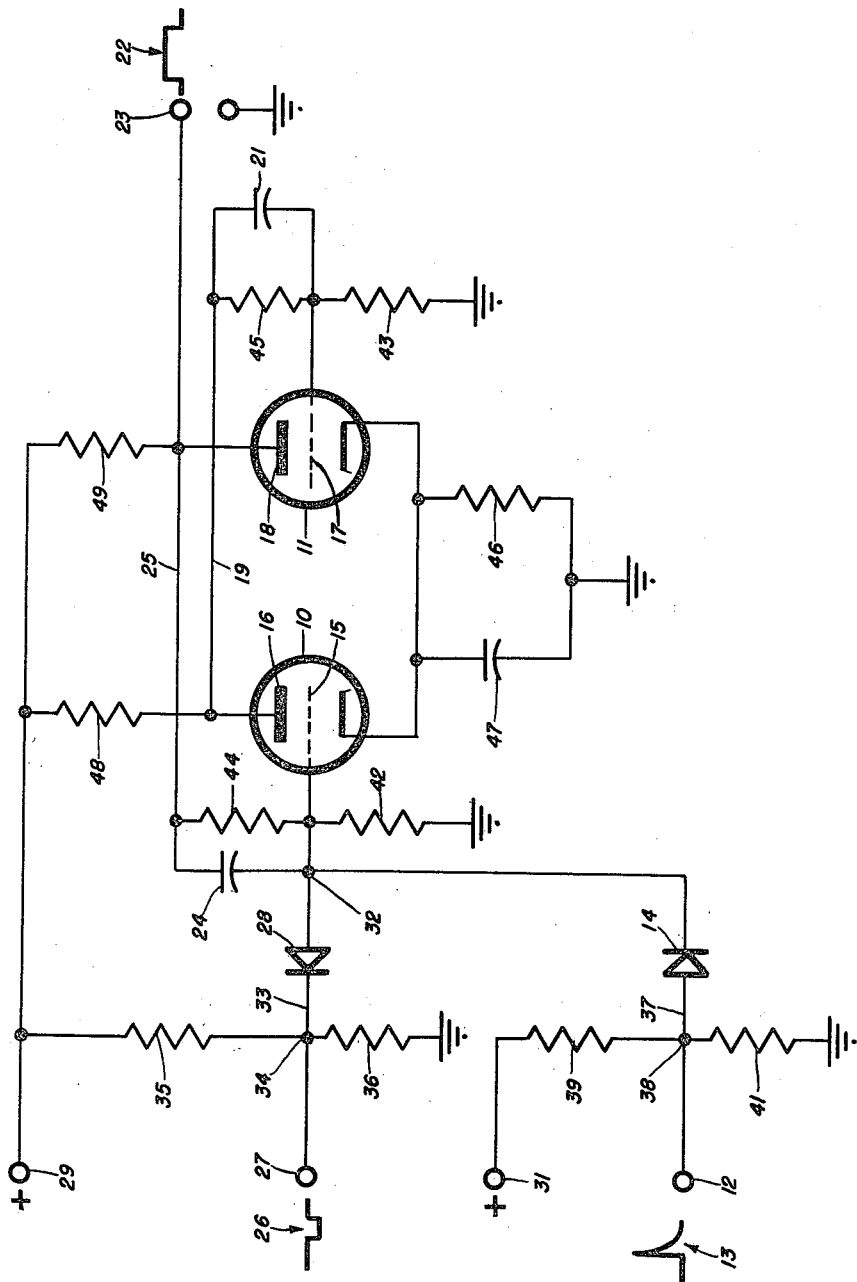

2,817,833

ACCURATE RANGE INDICATOR

James O. Hutchinson and John W. Taylor, Jr., Baltimore, Md., assignors, by mesne assignments, to the United States of America as represented by the Secretary of the Navy Application April 24, 1953, Serial No. 350,803

1 Claim. (Cl. 343—13)

The present invention relates to range indicators and more particularly to a new and novel system and method for transferring pulse-radar range information into direct current output by the employment of circuitry of the multivibrator type.

The accuracy of the output signal of a multivibrator type circuit depends upon the speed in which the circuit responds to applied trigger pulses. In conventional "scale of two" multivibrator circuits in which an output gate is formed by two successively applied pulses, the edges of the output wave form are subject to the interaction of time constants thereby reducing the accuracy of the information contained within the ouput wave form. The reduction of the time constant can be made at the expense of the output gate amplitude and only an approach can be made to the accuracy available in the circuit of the present invention. This information within the output wave form is represented by the area under the output wave form which can be integrated and transformed into direct current by circuitry which is well-known in the art.

The system and method disclosed herein provides for transmission of information having an accuracy of better than two tenths of a microsecond error in the width of the output gate. It has been found that conventional systems of the general type disclosed herein are not capable of transmitting information with the degree of accuracy of the present invention and that where one to two tenths microsecond error in the width of the output gate cannot be tolerated the system of the present invention may be employed to produce such extremely accurate information with satisfaction and the assurance of reliable results.

Consequently, the present invention contemplates the method of deriving a square wave output signal accurately proportional to the interval between two sequentially received pulses and having a potential of constant magnitude with a leading edge in time coincidence with the first pulse, and a trailing edge in time coincidence with the second pulse. Finally, the energy provided by the square wave output signal is measured.

The afore-mentioned method contemplated by the present invention is carried into effect by a circuit for converting the time interval between generated and received radar pulses into a square wave output signal accurately proportional to the time interval between the pulses as will become more clearly apparent as the description proceeds.

Accordingly, one object of the present invention resides in the provision of a system for transferring pulse-radar range information into a square wave output by the employment of circuitry of the multivibrator type, the output signal being a wave form having the leading edge thereof determined by a pulse coincident with the transmitted pulse and the trailing edge thereof determined by the received or echo pulse.

Another object of the present invention is the provision of a range indicator having circuitry of the multivibrator type in which the trigger pulses applied form the edges of the output wave form.

An additional object resides in the provision of a range indicator having multivibrator circuitry which is not sensitive to nominal fluctuation in supply voltage.

Still another object of the present invention is the provision of a range indicator which is extremely accurate, simple, stable, and compact.

Other objects and many of the attendant advantages of this invention will be readily appreciated as the same becomes better understood by reference to the following detail description when considered in connection with the accompanying drawing wherein is presented a schematic illustration of the circuitry employed in the practice of the present invention disclosing the multivibrator circuit and the manner in which initial and following pulses are connected thereto in order to effect at the output terminal a wave form having forward and rearward edges thereof coinciding exactly with the initial and following pulses, respectively.

Reference is now made to the circuitry disclosed in the drawing wherein two triodes 10 and 11 are interconnected as a multivibrator with trigger pulses of both the initial or generated pulse and the following or received pulse being applied to the grid of tube 10. Triodes 10 and 11 function as a pair of electronic switching devices as will be more fully appreciated after considering the remainder of the disclosure.

The initial pulse at terminal 12 which may have a form similar to that illustrated and generally designated by the reference numeral 13, is of sufficient magnitude to overcome the bias of the crystal 14 to thereby increase the voltage on grid 15 of triode 10 which causes the latter to conduct. The conduction of triode 10 decreases the voltage at plate 16. Conduction of triode 10 reduces the grid voltage on grid 17 of triode 11 because the plate 16 of the conducting triode 10 is connected by way of conductor 19 and capacitor 21 to grid 17 of triode 11. The reduction of voltage on the grid 17 of triode 11 causes the latter to stop conducting, tending to result in an output represented by the leading portion of signal 22 at the output terminal 23. In addition, the initial or generated pulse 13 is applied to plate 18 of triode 11 by way of capacitor 24 and conductor 25 to thereby form the leading edge of the ouput gate or wave form 22 in substantial time coincidence therewith and to hasten the change of triode 11 from the conducting to the nonconducting state.

The following pulse, alternatively termed the received or echo pulse, which may be similar in shape to that generally indicated by reference numeral 26 is applied at terminal 27 and reaches such a negative amplitude that it overcomes the bias on crystal 28 to thereby reduce the voltage on grid 15 of triode 10 and stop conduction of the latter.

When triode 10 is extinguished, the voltage on plate 16 thereof increases to thereby increase the potential on grid 17 of triode 11. This increase of voltage on grid 17 causes triode 11 to again conduct tending to provide the trailing portion of output signal 22 and placing the circuit in normal or steady state condition with tube 11 in full conduction and triode 10 cut off. It will be noted that the initial pulse is positive and the following pulse is negative. As in the case of the initial pulse, the following pulse is also coupled through capacitor 24 and conductor 25 to plate 18, thereby establishing the trailing edge of pulse 22 in substantial time coincidence therewith. It will be apparent, therefore, that the vertical edges of the output pulse are formed substantially exactly in time coincidence with the leading edges of the applied trigger pulses 13 and 26, respectively.

It will be observed that suitable power supply is provided at terminals 29 and 31.

It will be observed that a diode pulse-feeder circuit including diodes 14 and 28 is provided between pulse terminals 12 and 27 and the input terminal 32 to the multivibrator circuit. Each leg of the pulse-feeder circuit is connected to a voltage divider which is connected between its respective power supply terminal and ground. For example, leg 33 is connected at point 34 to a voltage divider circuit which includes resistor 35 connected between point 34 and power supply terminal 29 and resistor 36 which is connected between point 34 and ground. Leg 37 of the diode feeder circuit is connected to point 38 of a voltage divider circuit including resistor 39 connected between point 38 and power supply terminal 31 and resistor 41 connected between point 38 and ground.

Grid resistors 42 and 43 are connected to the grids of triodes 10 and 11, respectively, on one side thereof and on the other side to ground.

An RC circuit comprising resistor 44 and capacitor 24 is connected to the grid 15 of triode 10. A similar RC circuit is provided for the other half of the multivibrator circuit and comprises resistor 45 and capacitor 21 connected to grid 17 of triode 11. These RC circuits provide a sufficiently long time constant to assure the formation of a substantially horizontal top edge of wave form 22 until the negative pulse 26 is received at input terminal 27. A filter circuit comprising resistor 46 and capacitor 47 is connected between the cathodes of tubes 10 and 11 and ground to filter out transients.

The circuit disclosed herein has a saturation characteristic in that if no following pulse 26 appears within a predetermined length of time which is determined by the RC circuit including resistor 44 and capacitor 24, the circuit switches back to normal or steady state condition, as in the case of conventional multivibrator circuit.

It will be understood that a wide variety of component values may be chosen depending upon the operation desired. However, the following table is set forth as being illustrative of values which have been found satisfactory when the circuit is employed in connection with an aircraft altimeter:

| | |
|---|---|
| Power supply (terminals 29 and 31_____volts__ | +150 |
| Resistor 35_____kiloohms__ | 100 |
| Resistor 36_____do____ | 150 |
| Resistor 39_____do____ | 270 |
| Resistor 41_____do____ | 100 |
| Capacitor 24_____micromicrofarads__ | 150 |
| Resistor 44_____kiloohms__ | 270 |
| Resistor 42_____do____ | 82 |
| Resistor 48_____do____ | 12 |
| Resistor 49_____do____ | 10 |
| Resistor 45_____do____ | 180 |
| Capacitor 21_____micromicrofarads__ | 47 |
| Resistor 43_____kiloohms__ | 120 |
| Resistor 46_____do____ | 10 |
| Capacitor 47_____micromicrofarads__ | 820 |
| Triode 10_____ | 2C51 |
| Triode 11_____ | 2C51 |
| Diode 14_____ | 1N34 |
| Diode 28_____ | 1N34 |

Obviously many modifications and variations of the present invention are possible in the light of the above teachings. It is therefore to be understood that within the scope of the appended claims the invention may be practiced otherwise than as specifically described.

What is claimed is:

A network for converting the time spacing between generated and echo pulses into a square wave output signal accurately proportional thereto, comprising a diode pulse-feeder circuit having first and second pulse terminals, a first electronic switching device having a cathode, grid, and plate, a second electronic switching device having a cathode, grid, and plate, input and output terminals, said cathodes connected to ground through a filter circuit, each of said grids connected to ground through a grid resistor, the grid of said first device connected to said input terminal and connected to the plate of said second device and to said output terminal through a first RC circuit, the plate of said first device connected to the grid of said second device through a second RC circuit, a power supply, the plates of said devices connected to said power supply, said devices are biased to make said first device cut off and said second device conducting in a steady state condition, said diode pulse-feeder circuit connected to said input terminal, a positive generated pulse at said first pulse terminal being applied through said pulse-feeder circuit to the grid of said first device causing said first device to conduct for a predetermined time interval in an unsteady state condition determined by said first RC circuit, the conduction of said first device causing a decrease in its plate voltage, said decrease of plate voltage being applied to the grid of said second device through said second RC circuit causing said second device to cut off, said positive generated pulse being applied to said plate of said second device and said output terminal through said first RC circuit to form the leading edge of a square output signal in time coincidence therewith, said RC circiuts assuring a substantially horizontal top edge of said output signal, a subsequent negative echo pulse at said second pulse terminal being applied through said pulse-feeder circuit to the grid of said first device within the predetermined time interval causing said devices to return to the steady state condition, said echo pulse being applied to said plate of said second device and said output terminal through said first RC circuit to form the trailing edge of the square output signal in time coincidence therewith, whereby the integral of the output signal is proportional to said time spacing between generated and echo pulses.

References Cited in the file of this patent
UNITED STATES PATENTS

| | | |
|---|---|---|
| 2,265,290 | Knick _____ | Dec. 9, 1941 |
| 2,412,111 | Wilson _____ | Dec. 3, 1946 |
| 2,420,516 | Bischoff _____ | May 13, 1947 |
| 2,421,018 | DeRosa _____ | May 27, 1947 |
| 2,432,204 | Miller _____ | Dec. 9, 1947 |
| 2,441,957 | DeRosa _____ | May 25, 1948 |
| 2,485,584 | Ginzton _____ | Oct. 25, 1949 |